Figure 1:
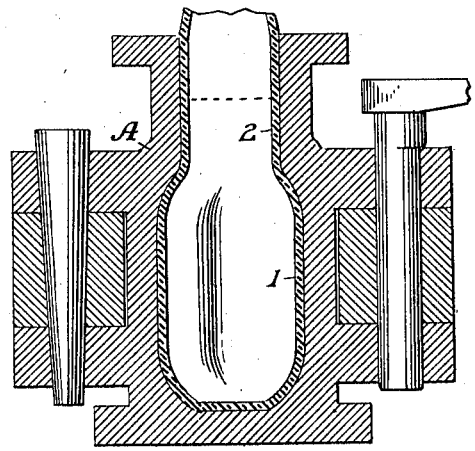

O. J. W. HIGBEE.
PROCESS OF MANUFACTURING GLASS VACUUM WALL BOTTLES.
APPLICATION FILED NOV. 29, 1910.

1,004,257.

Patented Sept. 26, 1911.

2 SHEETS—SHEET 1.

WITNESSES

INVENTOR
Orlando J. W. Higbee,
by Edward A. Lawrence,
his Attorney.

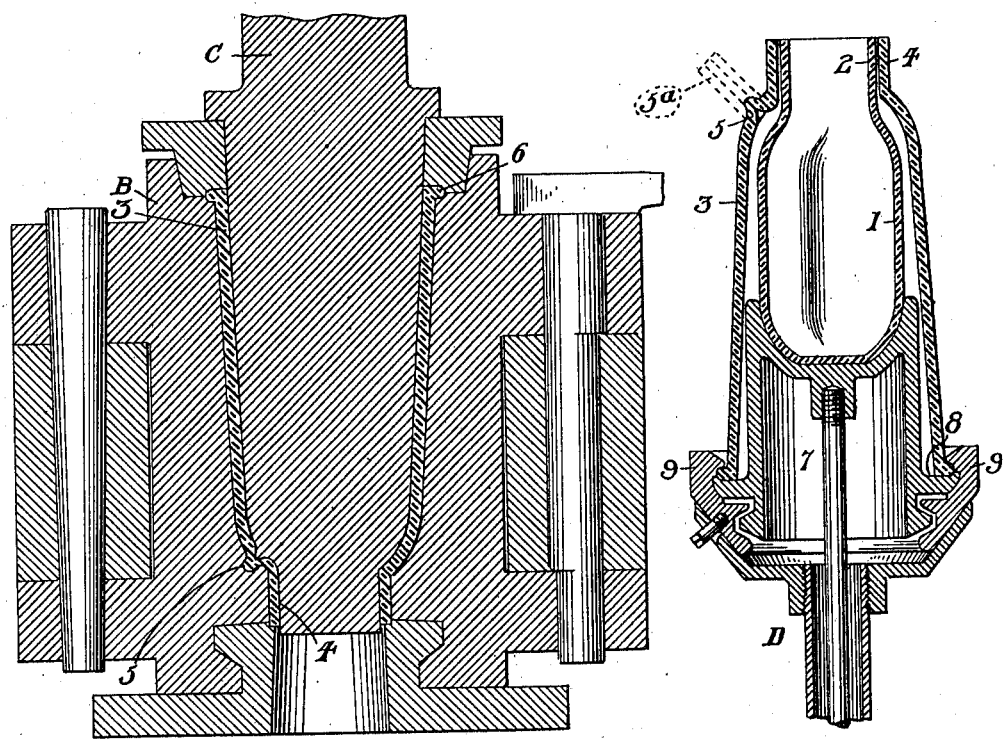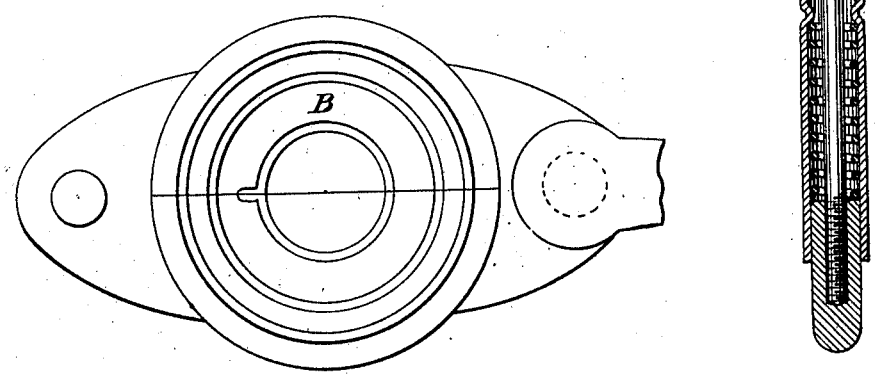

UNITED STATES PATENT OFFICE.

ORLANDO J. W. HIGBEE, OF PITTSBURG, PENNSYLVANIA.

PROCESS OF MANUFACTURING GLASS VACUUM-WALL BOTTLES.

1,004,257. Specification of Letters Patent. Patented Sept. 26, 1911.

Application filed November 29, 1910. Serial No. 594,680. REISSUED

*To all whom it may concern:*

Be it known that I, ORLANDO J. W. HIGBEE, a citizen of the United States, and residing in the city of Pittsburg, in the county of Allegheny and State of Pennsylvania, have invented or discovered new and useful Improvements in Processes of Manufacturing Glass Vacuum-Wall Bottles, of which the following is a specification.

My invention consists in a new and improved process for the manufacture of vacuum wall receptacles of glass.

Vacuum wall receptacles of glass, as now made, are composed of an inner bottle contained within an outer bottle and connected thereto by a cross wall of glass uniting the outer ends of the bottle necks, the vacuum chamber extending up between said necks. As this relatively thin wall of glass forms the sole attachment between the two bottles, the inner bottle is easily broken loose from the outer bottle and the usefulness of the receptacle destroyed unless the whole be inclosed in a cushioning outer case or box. An attempt to sterilize such a receptacle would result in its inevitable destruction, and the forcible insertion or withdrawal of a cork is frequently attended by a like result. In some cases manufacturers have attempted to support the inner bottle by means of foreign bodies or supports interposed between the bottles, but this expedient has not proven successful and adds to the expense of manufacture. Some better method is required for the efficient attachment and support of the inner bottle and the prevention of its vibration which would result in its breaking away from the outer bottle.

In the case of my improved vacuum wall glass receptacle, the necks of the two bottles telescope snugly and, when heated, are welded together for substantially their entire lengths, thus securing or suspending the inner bottle to the outer bottle in such a rigid and permanent manner that there is practically no vibration of the inner bottle and no foreign supports need be resorted to or cushioning case supplied to prevent a jar or blow from breaking the union between the two bottles. There is also no danger of breaking such union by the process of sterilization and the integral neck of the receptacle, thus formed, successfully resists rough treatment in inserting or withdrawing the cork or stopper. I thus also do away with the extension of the vacuum chamber up between the bottle necks where it serves no useful purpose but weakens the structure. Again in the types of vacuum wall receptacles now in use hollow projections are formed in the bottom of the outer bottle by means of which the air is withdrawn and the vacuum established. These projections when sealed off so distort the bottom of the outer bottle that the receptacle cannot rest stably on its own base but must be inserted in an outer casing or box. This greatly adds to the cost of the complete device and renders the same a luxury not to be utilized for ordinary domestic purposes.

In the manufacture of my receptacle, I provide a hollow projection on the shoulder of the outer bottle, adjacent to its neck, by which the air is withdrawn, and which, when sealed off, does not interfere with the stability of the bottle when placed on end.

As my receptacle is primarily intended to be used without an outer casing or box but uncovered, as an inexpensive bottle for holding liquids in the household, such as milk, infant's food, &c., for which an expensive receptacle would not be justified, the improved and stronger method of attaching the inner bottle to the outer bottle, so that comparatively rough usage, rapid changes in temperature as in sterilization, or the forcible insertion or withdrawal of a cork will not break such attachment or destroy the vacuum, and the stability of the receptacle when standing upright on the bottom of the outer bottle, greatly widen the scope of its usefulness.

Figure 6:
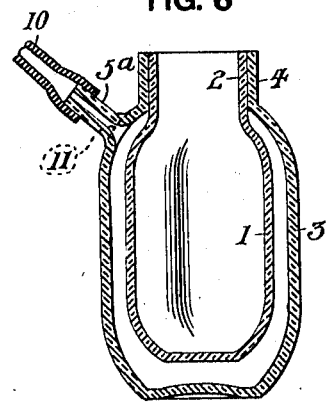
Figure 2:
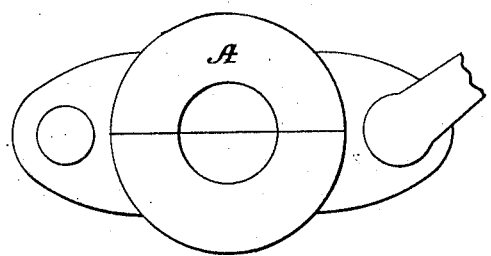

In the accompanying drawings, which illustrate my improved method of manufacturing vacuum wall receptacles, Figure 1 is a vertical section showing the inner bottle blown in a mold; Fig. 2 is a plan view of the same; Fig. 3 is a vertical section showing the outer bottle pressed in a mold; Fig. 4 is a plan view of the same; Fig. 5 is a vertical section showing the two bottles assembled on a snap and ready to be welded together at their necks, and Fig. 6 is a vertical section of the receptacle assembled and illustrating the means for producing a vacuum in the space between the two bottles.

The following is a detailed description of my process of manufacturing the article as illustrated in said drawings.

A is a blow mold, within which is formed the inner bottle 1, having a restricted neck 2. I prefer to use a wooden paste mold for this purpose.

B is the press mold, provided with plunger C, in which the outer bottle 3 is formed upside down and with open bottom. Bottle 3 is provided with a restricted neck 4. On the shoulder of bottle 3, adjacent to its neck, I form a hollow projection 5 which is later produced into a hollow tube for withdrawing the air to form the vacuum. The open bottom of bottle 3 is preferably provided with a bead 6 to enable the snap D to engage the same. The inner bottle 1 is now placed upright in the raised seat 7 of the snap D and the outer bottle 3 is passed down over the bottle 1, the sides of the seat 7 guiding the wall of the bottle 3 in proper alinement until the lower edge of said bottle rests upon the ledge 8 of said seat 7. The neck 4 of bottle 3 telescopes snugly over the neck 2 of bottle 1, and the beaded edge 6 is engaged by the jaws 9—9 of the snap D, thus holding the two bottles firmly together in place. The necks of the two bottles are then reheated and welded together for substantially their entire lengths by means of a suitable finishing tool, the hollow projection 5 being during the same heat produced to form a hollow tube 5ª for attachment to a vacuum pump. The integral neck of the receptacle is now seized by a suitable tool and the jaws of the snap D relaxed to release the bottle 3. The bottom edge of bottle 3 is now reheated and drawn together in the usual manner to form a flat stable bottom of said bottle as shown in Fig. 6. The tube 10 of a suitable vacuum pump, not shown, is now attached to tube 5ª and the air withdrawn from the space between the two bottles. The tube 5ª is then sealed off, as shown at 11 in Fig. 6, thus maintaining the vacuum.

It is evident from the foregoing that my improved process greatly cheapens and expedites the manufacture of vacuum wall receptacles and produces, at less expense, an article which is substantial enough to resist rough usage, sudden changes in temperature, the forcible withdrawal of a cork or stopper or insertion of the same and the other ordinary accidents of domestic use. It is also evident that by forming the hollow projection 5 adjacent to the neck of the bottle 3 I am enabled to reheat the glass of said projection during the same step when I reheat the bottle neck for welding the same, thus enabling me to weld such necks and produce the hollow tube 5ª in one and the same step, while, if such projection 5 and the tube 5ª were formed in the bottom of the outer bottle after the same was gathered, it would require an additional operation in the process—that of again reheating the bottom of the bottle to form the tube 5ª. I thus greatly shorten and cheapen the process by reducing the number of operations required in the same.

What I desire to claim is—

1. The process of manufacturing vacuum wall glass receptacles which consists in, first, forming a closed bottom bottle having a neck and a larger open bottom bottle having a neck adapted to telescope snugly over the neck of said first bottle, second, inserting said first bottle in said second bottle and welding their necks together for substantially their entire length, third, gathering the open bottom of said second bottle to inclose the same, and, fourth, establishing and sealing a vacuum in the space between said bottles, for the purpose described.

2. The process of manufacturing vacuum wall glass receptacles which consists in, first, forming a closed bottom bottle and a larger open bottom bottle having a neck adapted to telescope over the neck of said first bottle and forming a hollow projection on said second bottle adjacent to its neck, second inserting said first bottle in said second bottle, welding their necks together for substantially their entire lengths and producing said hollow projection into a hollow tube, third, gathering the open bottom of said second bottle to inclose the same, fourth, withdrawing the air from the space between said bottles through said hollow tube to form a vacuum chamber, and, fifth, sealing off said tube to maintain said vacuum, for the purpose described.

Signed at Pittsburg, Penna., this 25th day of November, 1910.

ORLANDO J. W. HIGBEE.

Witnesses:
T. CHALMERS DUFF,
EDWARD A. LAWRENCE.

---

Copies of this patent may be obtained for five cents each, by addressing the "Commissioner of Patents, Washington, D. C."